(12) United States Patent
Kim

(10) Patent No.: US 9,602,610 B2
(45) Date of Patent: Mar. 21, 2017

(54) ONLINE DATA MANAGEMENT

(71) Applicant: Empire Technology Development LLC, Wilmington, DE (US)

(72) Inventor: Seungil Kim, Seoul (KR)

(73) Assignee: Empire Technology Development LLC, Wilmington, DE (US)

( * ) Notice: Subject to any disclaimer, the term of this patent is extended or adjusted under 35 U.S.C. 154(b) by 327 days.

(21) Appl. No.: 14/007,635

(22) PCT Filed: May 7, 2013

(86) PCT No.: PCT/US2013/039833
§ 371 (c)(1),
(2) Date: Sep. 25, 2013

(87) PCT Pub. No.: WO2014/182280
PCT Pub. Date: Nov. 13, 2014

(65) Prior Publication Data
US 2014/0337409 A1    Nov. 13, 2014

(51) Int. Cl.
| G06F 15/16 | (2006.01) |
| H04L 29/08 | (2006.01) |
| H04N 21/658 | (2011.01) |
| H04N 21/258 | (2011.01) |
| H04N 21/2343 | (2011.01) |

(52) U.S. Cl.
CPC ......... *H04L 67/24* (2013.01); *H04L 67/2823* (2013.01); *H04L 67/303* (2013.01); *H04N 21/6582* (2013.01); *H04N 21/2343* (2013.01); *H04N 21/25825* (2013.01); *H04N 21/25833* (2013.01); *H04N 21/25841* (2013.01)

(58) Field of Classification Search
CPC .......... H04N 21/6582; H04N 21/2343; H04N 21/25825; H04N 21/25833; H04N 21/25841
See application file for complete search history.

(56) References Cited

U.S. PATENT DOCUMENTS

| 8,261,194 B2 | 9/2012 | Billiard |
| 2002/0032743 A1* | 3/2002 | Lee et al. ..................... 709/206 |
| 2008/0189360 A1 | 8/2008 | Kiley et al. |

(Continued)

FOREIGN PATENT DOCUMENTS

WO    2007040514 A1    4/2007

OTHER PUBLICATIONS

International Search Report from corresponding International Application No. PCT/US13/39833 mailed Jul. 11, 2013.

(Continued)

*Primary Examiner* — Nam Tran
(74) *Attorney, Agent, or Firm* — Brundidge & Stanger, P.C.

(57) ABSTRACT

Technologies are generally described for a data management scheme. In some examples, a method may include displaying, by a client device, a representation of a data item received from a server; transmitting, by the client device, to the server, a request to access the data item and information regarding the request to access, in response to a user input; updating, by the server, the representation of the data item to further include the information regarding the request to access; and displaying, by the client device, the updated representation of the data item received from the server.

21 Claims, 7 Drawing Sheets

| UNREAD | SENDER | TITLE | READ BY | READ AT |
|---|---|---|---|---|
|  | Sender A | Title A | Mobile | Subway |
| ● | Sender B | Title B | - | - |
| ● | Sender C | Title C | - | - |
|  | Sender D | Title D | PC | Office |
| ⋮ | ⋮ | ⋮ | ⋮ | ⋮ |

(56) References Cited

U.S. PATENT DOCUMENTS

2008/0306972 A1* 12/2008 Wilkin et al. ................. 709/206
2012/0078997 A1*  3/2012 Evans et al. ................. 709/203
2014/0006525 A1*  1/2014 Freund et al. ................ 709/206
2014/0032636 A1*  1/2014 Nelson ............... H04N 21/2343
                                                     709/203

OTHER PUBLICATIONS gallery.zimbra.com/type/zimlet/x-mailer, X-Mailer, Zimbra Gallery, by RRAO, 2013.
glockanalytics.com/email-tracking-service-review, G-Lock Analytics, Best Email Tracking Service Review, 2013.
https://www.jangomail.com/Email-Marketing-Device-Browser-Report.asp., Email Marketing News—See what device or browswer recipients open emails with, 2013, JangoMail.
What is a X-Mailer Header?, www.ehow.com/info_12215165_xmailer-header.html., 2013.
"DidTheyReadIt?", The Best Email Tracking Software Sends You Email Message Read Receipts, www.didtheyreadit.com/index/php, 2013.

* cited by examiner

| UNREAD | SENDER | TITLE | READ BY | READ AT |
|---|---|---|---|---|
| | Sender A | Title A | Mobile | Subway |
| ● | Sender B | Title B | - | - |
| ● | Sender C | Title C | - | - |
| | Sender D | Title D | PC | Office |
| ⋮ | ⋮ | ⋮ | ⋮ | ⋮ |

ONLINE DATA MANAGEMENT

CROSS-REFERENCE TO RELATED APPLICATION

This Application is the U.S. National Stage filing under 35 U.S.C. §371 of PCT Application Ser. No. PCT/US13/39833 filed on May 7, 2013. The disclosure of the PCT Application is hereby incorporated herein by reference in its entirety.

BACKGROUND

High-end mobile electronic devices, such as smartphones and tablets, provide ubiquitous network connectivity to the users thereof. For example, a user may use his/her mobile electronic devices to read online data such as an electronic mail, a post in an SNS (social networking service), or a news article at anytime, anywhere. However, due to the relatively small sizes of the mobile electronic devices, the user may experience difficulty with reading the online data. In such cases, the user may want to read the online data again using other electronic devices with larger screens.

SUMMARY

In an example, a method may include displaying, by a client device, a representation of a data item received from a server; transmitting, by the client device, to the server, a request to access the data item and information regarding the request to access, in response to a user input; updating, by the server, the representation of the data item to further include the information regarding the request to access; and displaying, by the client device, the updated representation of the data item received from the server.

In another example, a data management server may include a receiver unit configured to receive, from a client device, a request to access a data item and information regarding the request to access; and a representation generation unit configured to generate a representation of the data item to include the received information regarding the request to access.

In yet another example, a method performed under control of a data management server may include receiving, from a client device, a request to access a data item; receiving, from the client device, information regarding the request to access; and generating a representation of the data item to include the information regarding the request to access.

In still another example, a computer-readable storage medium may store thereon computer-executable instructions that, in response to execution, cause a processor to perform operations, including displaying a representation of a data item stored in a data storage; displaying an indication of whether the data item has been accessed by a user account; and displaying information regarding a previous access by the user account for the data item.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figures 1, 2:
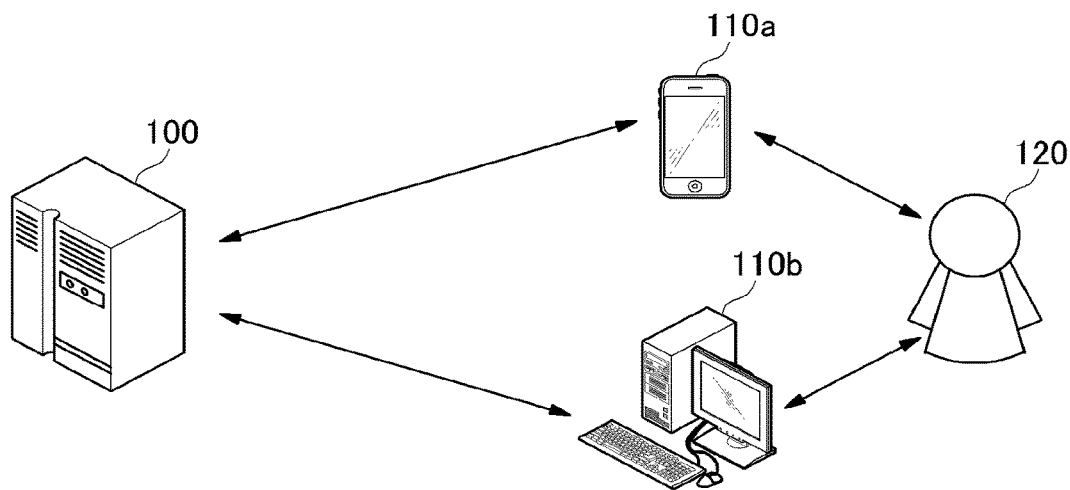
FIG. 1 schematically shows an illustrative example of an environment in which a data management server provides client devices with a representation of data items, arranged in accordance with at least some embodiments described herein.
FIG. 2 schematically shows an illustrative example of a representation of data items that is displayed on a client device, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to online data management. Further, technologies are herein generally described for providing a user, who may use one or more devices by which he/she may access online data, with a scheme to keep track of by which device he/she has accessed the online data and/or where he/she has accessed the online data.

In some examples, the user may try to access a data item (e.g., read an electronic mail, an SNS (social networking service) post, or a news article), which may be stored in a remote data storage, using a first device. In such cases, the first device may transmit a request to access the data item to a data management server in response to a user input, and then a procedure of accessing the data item from the first device may be initiated. The data management server may be hosted by or in cooperation with a service provider associated with the data item such as, for example, an electronic mail service provider, an SNS provider, or an online content provider.

In some examples, the first device may also transmit, to the data management server, information regarding the request to access, including device information regarding the first device and/or location information of the first device at the time the request was transmitted. Examples of the device information regarding the first device may include a name of the first device, a type of the first device, a screen size of the first device, a display resolution of the first device, and/or information regarding a network to which the first device is communicatively connected. Further, examples of the location information of the first device at the time the request was transmitted may include information regarding a registered location that is specific to the user, GPS (Global Positioning System) coordinates of the first device, information regarding a cellular network to which the first device is communicatively connected, information regarding a Wi-Fi access point to which the first device is communicatively connected, an IP address, and/or information regarding communication between the first device and at least one nearby beacon. By way of example, but not limitation, when the user tries to read the data item using a smartphone in a subway, the smartphone may transmit the device information identifying itself and/or the location information indicating that it is in the subway. By way of another example, but not limitation, when the user tries to read the data item using a personal computer (PC) in an office, the PC may transmit the device information identifying itself and/or the location information indicating that it is in the office.

Then, in some examples, the data management server may generate a representation of the data item to include the information regarding the request to access. For instance, the representation of the data item may include an indication of whether the data item has been previously accessed by a device owned and/or controlled by the user that may be identified based on one or more user accounts to which the user has registered and/or signed in to, the device information regarding the first device that has accessed the data item, and/or the location information regarding a location at which the first device has accessed the data item. Then, in some examples, the data management server may provide the representation of the data item to the first device and/or one or more other devices owned and/or controlled by the user, so that the user may be aware by which device he/she accessed the data item and/or where he/she accessed the data item.

In some further examples, the data management server may receive, from the first device and/or a second device owned and/or controlled by the user, a subsequent request to access the data item. In such cases, the data management server may also receive information regarding the subsequent request to access. Then, the data management server may update the representation of the data item to include the information regarding the subsequent request to access.

FIG. 1 schematically shows an illustrative example of an environment in which a data management server provides client devices with a representation of data items, arranged in accordance with at least some embodiments described herein.

As depicted, a data management server 100 may be communicatively coupled to client devices 110a and/or 110b, which may be owned and/or controlled by a user 120, over a network such as, for example, the Internet, a cellular network, a wide area network (WAN), a metropolitan area network (MAN), a local area network (LAN), a campus area network (CAN), a virtual private network (VPN), etc. Client devices 110a and/or 110b may be of any type of electronic device configured to store, retrieve, compute, transmit and/or receive data, including, for example, a smartphone, a mobile phone, a personal digital assistant (PDA), a tablet, a personal computer such as a laptop computer or a desktop computer, a television, a gaming console, etc.

In some embodiments, data management server 100 may be hosted by or in cooperation with an online service provider such as, for example, an electronic mail service provider, an SNS provider, or an online content provider, so that user 120 may access the data items (e.g., electronic mails, posts in one or more SNS (social networking service), or news articles, etc.) provided by the online service provider based on, at least in part, interaction between data management server 100 and client devices 110a and/or 110b owned and/or controlled by user 120.

In some embodiments, data management server 100 may identify an association between client devices 110a and/or 110b and user 120 based on one or more user accounts of user 120. That is, data management server 100 may determine that client devices 110a and/or 110b are owned and/or controlled by user 120 based on the user accounts used by user 120 to log on to data management server 100 from client devices 110a and/or 110b.

In some embodiments, user 120 may use client device 110a (e.g., a smartphone as illustrated in FIG. 1) to try to initially access one of the data items (e.g., read an electronic mail, an SNS post, or a news article, etc.), which may be stored in a remote data storage associated with the online service provider. In such cases, client device 110a may transmit a request to access the data item to data management server 100, in response to an input of user 120. Client device 110a may also transmit, to data management server 100, information regarding the request to access, including device information regarding client device 110a and/or location information of client device 110a at the time of transmitting the request. Examples of the device information regarding client device 110a may include a name of client device 110a, a type of client device 110a, a screen size of client device 110a, a display resolution of client device 110a, and/or information regarding a network to which client device 110a is communicatively connected. Further, examples of the location information of client device 110a at the time of transmitting the request may include information regarding a registered location that is specific to user 120, GPS (Global Positioning System) coordinates of client device 110a, information regarding a cellular network to which client device 110a is communicatively connected, information regarding a Wi-Fi access point to which client device 110a is communicatively connected, and/or information regarding communication between client device 110a and at least one nearby beacon.

In some further embodiments, data management server 100 may generate a representation of the data item to include the information regarding the request to access. Then, data management server 100 may provide the representation of the data item to client devices 110a and/or 110b, so that user 120 may be aware by which device he/she accessed the data item and/or where he/she accessed the data item. Example embodiments of the representation of the data item will be described in more detail with reference to FIG. 2.

In some embodiments, when user 120 tries to access the same data item again using client device 110a, client device 110a may transmit, to data management server 100, a subsequent request to access the data item. In such cases, data management server 100 may receive, from client device 110a, the subsequent request to access, with information regarding the subsequent request to access including device information regarding client device 110a and/or location information of client device 110a at the time the subsequent request was transmitted, and update the representation of the data item to include the information regarding the subsequent request.

In some other embodiments, when user 120 tries to access the same data item using client device 110b (e.g., a personal computer as illustrated in FIG. 1), client device 110b may transmit, to data management server 100, a subsequent request to access the data item. In such cases, data management server 100 may receive, from client device 110b, the subsequent request to access, with information regarding the subsequent request to access including device information regarding client device 110b and/or location information of client device 110b at the time the subsequent request was transmitted, and update the representation of the data item to include the information regarding the subsequent request.

Although the example embodiments described with regard to FIG. 1 illustrate that user 120 uses two client devices to access the data items provided by the online service provider, those skilled in the art will readily appreciate that user 120 may use any number of client devices.

FIG. 2 schematically shows an illustrative example of a representation 200 of data items that is displayed on client devices 110a and/or 110b, arranged in accordance with at least some embodiments described herein. Reference may be made to the embodiments depicted and described with reference to FIG. 1.

As depicted, representation 200 may include a displayed listing of data items that includes an indication 210 of whether each data item has been previously accessed by one or more user accounts of user 120, sender information 220 regarding a source of each data item, title information 230 including a title, header, or subject line of each data item, device information 240 regarding a device under the ownership and/or control of user 120 by which one or more data items may have been previously accessed, and/or location information 250 regarding a location at which one or more of the data items may have been previously accessed by the one or more user accounts. By way of example, but not limitation, the data items listed in representation 200 may include electronic mails, posts in one or more SNS (social networking service), or news articles posted by information sources to which user 120 has subscribed. For instance, when one or more of the data items are electronic mails, sender information 220 may indicate who sent the electronic mails, and title information 230 may list the subject line of the respective electronic mails; when one or more of the data items are SNS posts, sender information 220 may indicate who wrote the SNS posts, and title information 230 may list the subject line or at least introductory words of the respective SNS posts; and when one or more of the data items are news articles, sender information 220 may indicate news organizations that published the respective news articles or journalists who wrote the respective news articles, and title information 230 may list at least a portion of the headline for each of the respective news articles.

In some embodiments, device information 240 may indicate by which client device the one or more user accounts previously accessed each of the respective data items (e.g., a mobile device, a personal computer (PC), etc.). By way of example, but not limitation, device information 240 may include at least one of a name of the client device, a type of the client device, a screen size of the client device, a display resolution of the client device, or information regarding a network to which the client device is communicatively connected when each data item was accessed.

In some embodiments, location information 250 may indicate a location at which the one or more user accounts previously accessed each of the respective data items (e.g., at an address, at office, at home, in a subway, on a bus, etc.). By way of example, but not limitation, location information 250 may include at least one of information regarding a registered location that is specific to user 120 (e.g., office, home, etc.), a GPS (Global Positioning System) coordinate of the client device, information regarding a cellular network to which the client device is communicatively connected, information regarding a Wi-Fi access point to which the client device is communicatively connected, or information regarding communication between the client device and at least one nearby beacon when each data item was accessed.

By providing the one or more user accounts with representation 200 including device information 240 and location information 250 to be displayed on any device that user 120 may use, user 120 may keep track of by which device he/she has accessed the respective data items and/or where he/she has accessed the respective data items.

Figure 3:
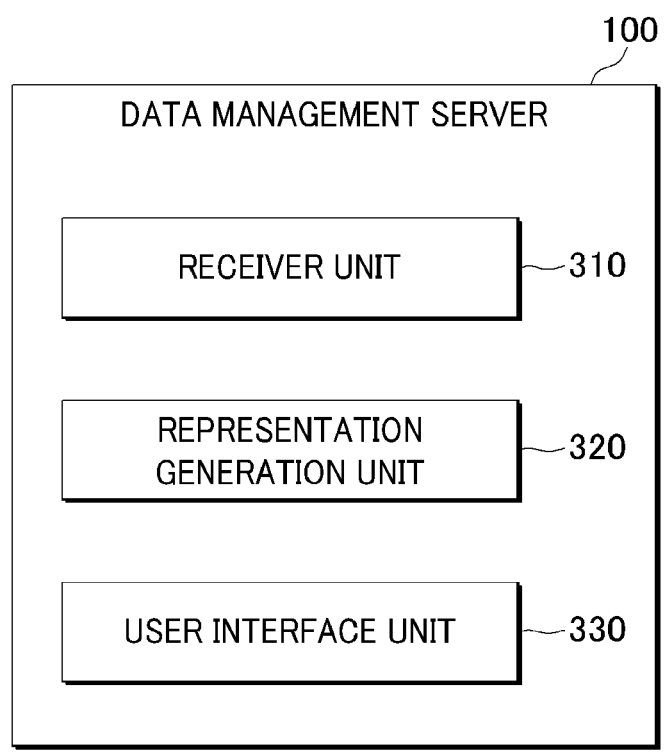
FIG. 3 shows a schematic block diagram illustrating an example architecture of a data management server for implementing a data management scheme, arranged in accordance with at least some embodiments described herein.

FIG. 3 shows a schematic block diagram illustrating an example architecture of data management server 100 for implementing a data management scheme, arranged in accordance with at least some embodiments described herein. Reference may be made to the embodiments depicted and described with reference to FIGS. 1-2.

As depicted, data management server 100 may include a receiver unit 310, a representation generation unit 320 and a user interface unit 330. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Receiver unit 310 may be configured to receive, from client device 110a or 110b, a request to access a data item and information regarding the request. The data item may be stored in and/or provided by a server of a service provider (e.g., an electronic mail service provider, an SNS provider, or an online content provider) that may host or otherwise cooperate with data management server 100.

In some embodiments, the information regarding the request may include at least one of device information regarding client device 110a or 110b or location information of client device 110a or 110b. By way of example, but not limitation, the device information regarding client device 110a or 110b may include at least one of a name of client device 110a or 110b, a type of client device 110a or 110b, a screen size of client device 110a or 110b, a display resolution of client device 110a or 110b, or information regarding a network to which client device 110a or 110b was communicatively connected when receiver unit 310 received the request to access. Further, by way of example, but not limitation, the location information of client device 110a or 110b may include at least one of a registered location that is specific to user 120, a GPS (Global Positioning System) coordinate of client device 110a or 110b, information regarding a cellular network to which client device 110a or 110b is communicatively connected, information regarding a Wi-Fi access point to which client device 110a or 110b is communicatively connected, or information regarding communication between client device 110a or 110b and at least one nearby beacon when receiver unit 310 received the request to access.

Representation generation unit 320 may be configured to generate a representation of the data item to include the information regarding the request to access that may be received by receiver unit 310. In some embodiments, when receiver unit 310 receives, from client device 110a or 110b, a subsequent request to access the same data item and information regarding the subsequent request to access, representation generation unit 320 may be further configured to update the representation of the data item to include the information regarding the subsequent request to access.

User interface unit 330 may be configured to receive a request to display the representation of the data item from client device 110a or 110b, and to provide client device 110a or 110b with the representation of the data item in response to the request to display.

Figure 4:
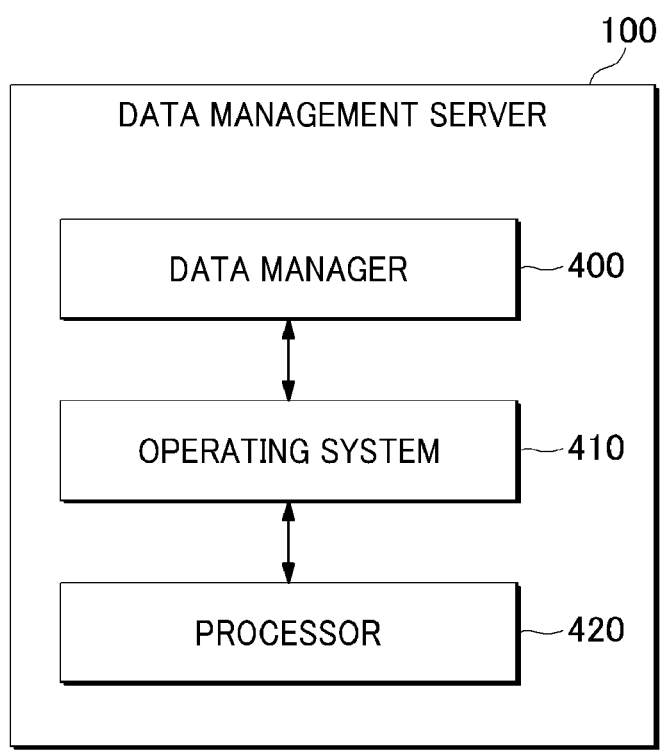
FIG. 4 shows a schematic block diagram illustrating another example architecture of a data management server for implementing a data management scheme, arranged in accordance with at least some embodiments described herein.

FIG. 4 shows a schematic block diagram illustrating another example architecture of data management server 100 for implementing a data management scheme, arranged in accordance with at least some embodiments described herein. Reference may be made to the embodiments depicted and described with reference to FIGS. 1-3.

As depicted, data management server 100 may include a data manager 400, an operating system 410 and a processor 420. Data manager 400 may be an application adapted to operate on operating system 410 such that the data management scheme, as described herein, may be provided. Operating system 410 may allow data manager 400 to manipulate processor 420 to implement the data management scheme as described herein.

Figure 5:
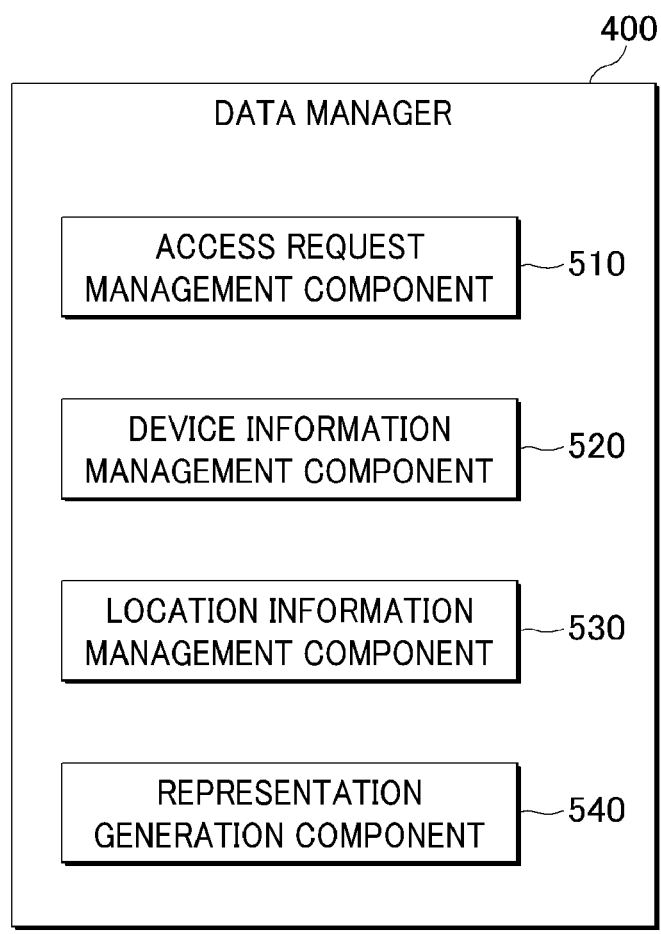
FIG. 5 shows a schematic block diagram illustrating an example architecture of a data manager for implementing a data management scheme, arranged in accordance with at least some embodiments described herein.

FIG. 5 shows a schematic block diagram illustrating an example architecture of data manager 400 for implementing a data management scheme, arranged in accordance with at least some embodiments described herein. Reference may be made to the embodiments depicted and described with reference to FIGS. 1-4.

As depicted, data manager 400 may include an access request management component 510, a device information management component 520, a location information management component 530, and a representation generation component 540.

Access request management component 510 may be adapted to manage a request, received from multiple client devices including client devices 110a and/or 110b, to access a data item.

Device information management component 520 may be adapted to keep track of an identification of a client device by which user 120 has requested access to the data item. That is, device information management component 520 may detect device information regarding a client device from which one or more requests to access the data item are received, and update the device information when access request management component 510 detects a subsequent request to access the data item.

Location information management component 530 may be adapted to keep track of a location from which user 120 has utilized a client device to request access to the data item. That is, location information management component 530 may detect location information regarding a location of user 120 when access request management component 510 detects the request to access the data item, and update the location information when access request management component 510 detects the subsequent request to access the data item.

Representation generation component 540 may be adapted to generate representation 200 of the data item to include the device information and the location information respectively tracked by device information management component 520 and location information management component 530. Representation generation component 540 may also be adapted to update the representation of the data item when access request management component 510 detects the subsequent request to access the data item.

Figure 6:
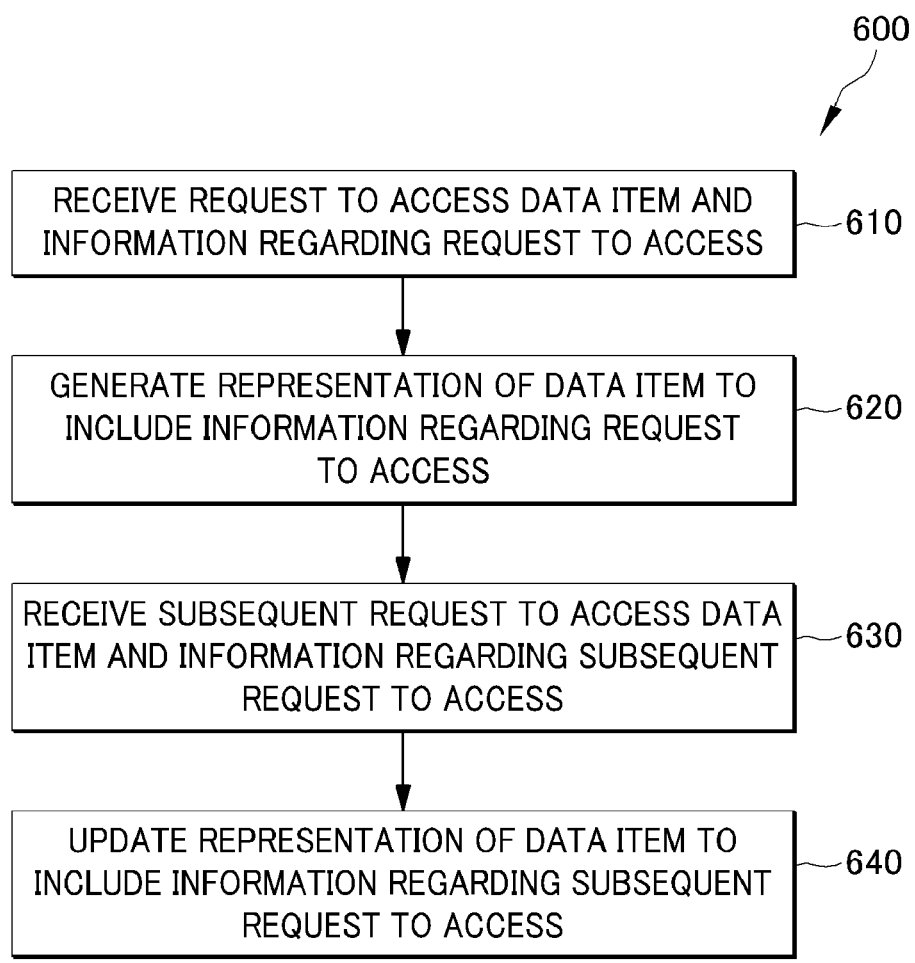
FIG. 6 shows an example flow diagram of a process for a data management server implementing a data management scheme, arranged in accordance with at least some embodiments described herein.

FIG. 6 shows an example flow diagram of a process 600 for a data management server implementing a data management scheme, arranged in accordance with at least some embodiments described herein.

Process 600 may be implemented in a data management server such as data management server 100 including receiver unit 310, representation generation unit 320 and user interface unit 330. Process 600 may also be implemented by computer programs or program modules that are adapted to provide the data management scheme and hosted by a data management server, such as data manager 400 including access request management component 510, device information management component 520, location information management component 530, and representation generation component 540. Thus, reference may be made to the embodiments depicted and described with reference to FIGS. 1-5. Process 600 may include one or more operations, actions, or functions as illustrated by one or more blocks 610, 620, 630 and/or 640. Although illustrated as discrete blocks, various blocks may be divided into additional blocks, combined into fewer blocks, or eliminated, depending on the desired implementation. Processing may begin at block 610.

At block 610 (Receive Request to Access Data Item and Information Regarding Request to Access), data management server 100 and/or data manager 400 may receive, from client device 110a or 110b, a request to access a data item and information regarding the request to access. The information regarding the request to access may include at least one of device information regarding client device 110a or 110b or location information of client device 110a or 110b. Processing may continue from block 610 to block 620.

At block 620 (Generate Representation of Data Item to Include Information Regarding Request to Access), data management server 100 and/or data manager 400 may generate a representation of the data item to include the information regarding the request to access. Processing may continue from block 620 to block 630.

At block 630 (Receive Subsequent Request to Access Data Item and Information Regarding Subsequent Request to Access), data management server 100 and/or data manager 400 may receive, from client device 110a or 110b, a subsequent request to access the data item and information regarding the subsequent request to access. The information regarding the subsequent request to access may include at least one of device information associated with the subsequent request to access or location information associated with the subsequent request to access. Processing may continue from block 630 to block 640.

At block 640 (Update Representation of Data Item to Include Information Regarding Subsequent Request to Access), data management server 100 and/or data manager 400 may update the representation of the data item to include the information regarding the subsequent request to access. Processing may continue from block 640 back to block 630 in some embodiments.

As such, data management server 100 and/or data manager 400 may provide a user with the representation of the data item including the device information and/or the location information, thereby allowing the user to be aware by which device he/she accessed the data item and/or where he/she accessed the data item.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
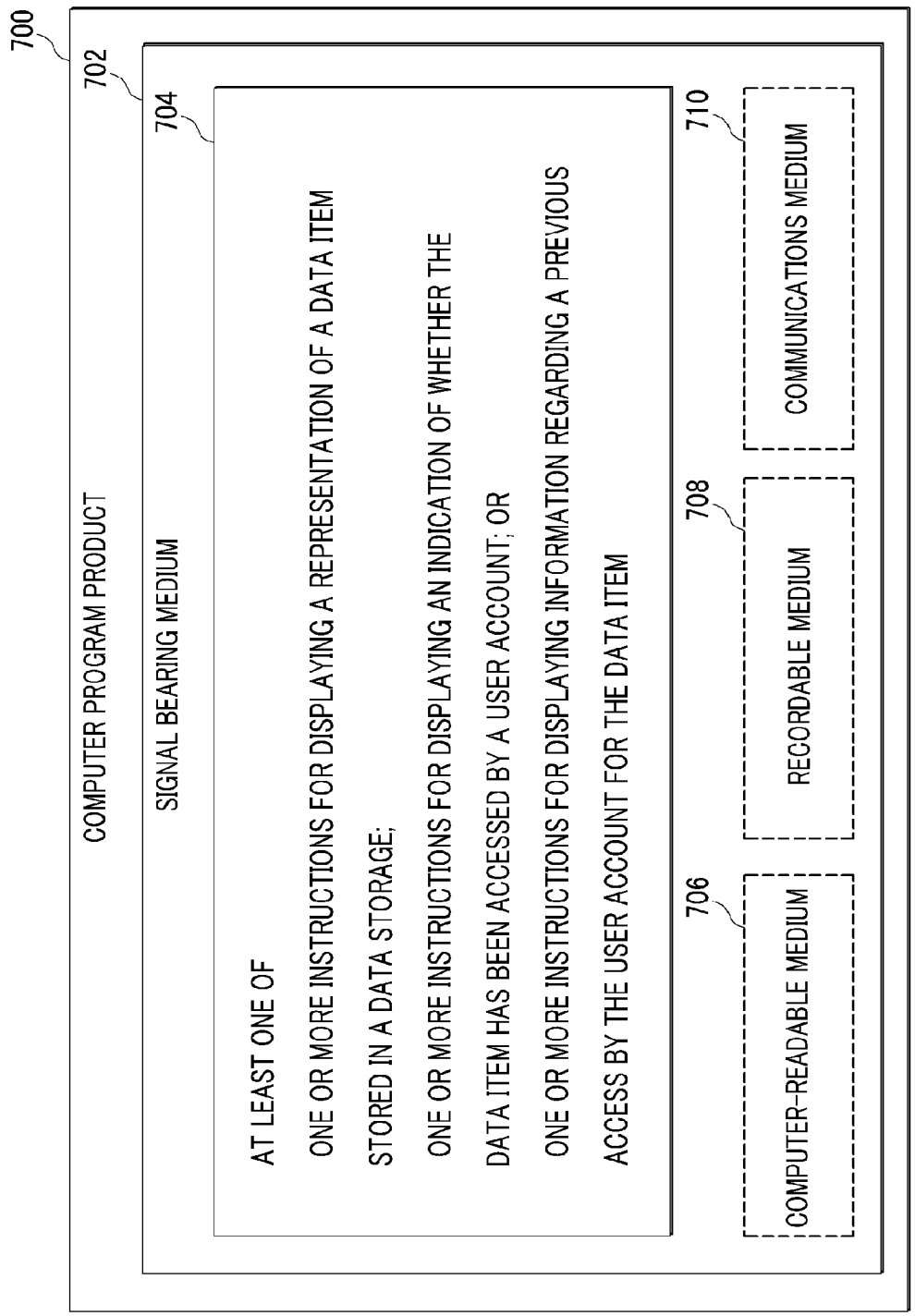
FIG. 7 illustrates an example computer program product that may be utilized to implement a data management scheme, arranged in accordance with at least some embodiments described herein.

FIG. 7 illustrates an example computer program product 700 that may be utilized to implement a data management scheme, arranged in accordance with at least some embodiments described herein.

As depicted, computer program product 700 may include a signal bearing medium 702. Signal bearing medium 702 may include one or more instructions 704 that, when executed by, for example, a processor of client device 110a or 110b, may provide the functionality described above with respect to FIGS. 1-6. By way of example, instructions 704 may include: one or more instructions for displaying a representation of a data item stored in a data storage; one or more instructions for displaying an indication of whether the data item has been accessed by a user account; or one or more instructions for displaying information regarding a previous access by the user account for the data item.

In some implementations, signal bearing medium 702 may encompass a computer-readable medium 706, such as, but not limited to, a hard disk drive, a CD, a DVD, a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, computer program product 700 may be conveyed to one or more modules of client device 110a or 110b that may interact with data management server 100 and/or data manager 400 by an RF signal bearing medium 702, where the signal bearing medium 702 is conveyed by a wireless communications medium 710 (e.g., a wireless communications medium conforming with the IEEE 802.11 standard).

Figure 8:
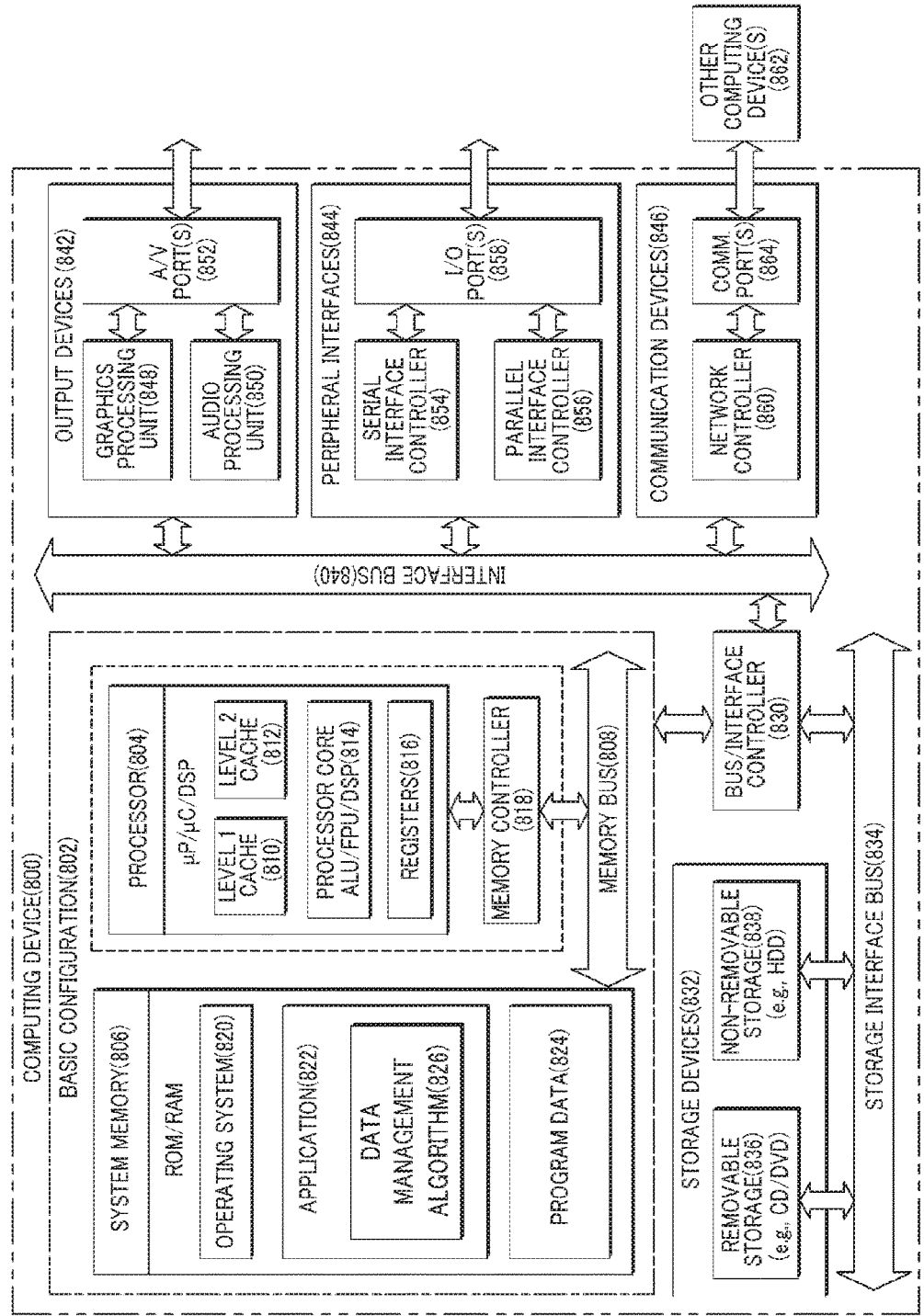
FIG. 8 is a block diagram illustrating an example computing device that may be utilized to implement a data management scheme, arranged in accordance with at least some embodiments described herein.

FIG. 8 is a block diagram illustrating an example computing device 800 that may be utilized to implement a data management scheme, arranged in accordance with at least some embodiments described herein.

In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor ($\mu$P), a microcontroller ($\mu$C), a digital signal processor (DSP), or any combination thereof. Processor 804 may include one or more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), nonvolatile memory (such as ROM, flash memory, etc.) or any combination thereof. System memory 806 may include an operating system 820, one or more applications 822, and program data 824.

Application 822 may include a data management algorithm 826 that may be arranged to perform the functions as described herein including the actions described with respect to the data management server 100 architecture as shown in FIGS. 3-5 or including the actions described with respect to the flow charts shown in FIG. 6. Program data 824 may include any data that may be useful for providing the data management scheme as is described herein. In some examples, application 822 may be arranged to operate with program data 824 on an operating system 820 such that the data management scheme as described herein may be provided.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method, comprising:
 displaying, by a client device, a representation of a data item, the representation being based on representation data associated with the data item received from a server, the representation comprising device information regarding at least one device that previously accessed the data item and location information regarding a location at which the at least one device previously accessed the data item;
 transmitting, by the client device, to the server, a request to access the data item and information regarding the request to access that includes device information regarding the client device requesting access to the data item and location information regarding a location at which the client device is requesting access to the data item, in response to a user input, wherein the representation data associated with the data item is updated by the server to further include the transmitted information regarding the request to access;
 receiving, by the client device, the requested access to the data item and the updated representation data from the server; and
 displaying, by the client device, an updated representation of the data item based on the received updated representation data.

2. The method of claim 1, wherein the data item includes an electronic mail, a post in an SNS (social networking service), or a news article.

3. A data management server, comprising:
 a memory; and
 at least one processor configured to:
 receive, from at least one device that previously accessed a data item, device information regarding the at least one device and location information regarding a location at which the at least one device previously accessed the data item,
 generate representation data associated with the data item including the device information and location information received from the at least one device,
 receive, from a client device, a request to access the data item and information regarding the request to access that includes device information regarding the client device and location information of the client device,
 update the representation data associated with the data item to include the received information regarding the request to access, and
 provide the requested access and the updated representation data to the client device, wherein the client device displays a representation of the data item based on the updated representation data.

4. The data management server of claim 3, wherein the device information regarding the client device includes at least one of a name of the client device, a type of the client device, a screen size of the client device, a display resolution of the client device, or information regarding a network to which the client device is communicatively connected when the request to access is received.

5. The data management server of claim 3, wherein the location information of the client device includes at least one of information regarding a registered location that is specific to a user of the client device, a GPS (Global Positioning System) coordinate of the client device, information regarding a cellular network to which the client device is communicatively connected, information regarding a Wi-Fi access point to which the client device is communicatively connected, or information regarding communication between the client device and at least one beacon when the request to access is received.

6. The data management server of claim 3, wherein the at least one processor is further configured to:
 receive, from the client device, a subsequent request to access the data item and information regarding the subsequent request to access, and
 update the representation data associated with the data item to include the information regarding the subsequent request to access.

7. The data management server of claim 3, wherein the at least one processor is further configured to:
 receive, from another client device, a subsequent request to access the data item and information regarding the subsequent request to access, and
 update the representation data associated with the data item to include the information regarding the subsequent request to access.

8. The data management server of claim 3, wherein the data item is an electronic mail.

9. The data management server of claim 8, wherein the data management server is hosted by an electronic mail service provider.

10. The data management server of claim 3, wherein the data item is a post on a page of an SNS (social networking service).

11. The data management server of claim 10, wherein the data management server is hosted by an SNS provider.

12. The data management server of claim 3, wherein the data item is a news article.

13. The data management server of claim 12, wherein the data management server is hosted by an online content provider.

14. A method performed under control of a data management server, comprising:
 receiving, from at least one device that previously accessed a data item, device information regarding the at least one device and location information regarding a location at which the at least one device previously accessed the data item;
 generating representation data associated with the data item including the device information and location information received from the at least one device;
 receiving, from a client device, a request to access the data item;
 receiving, from the client device, information regarding the request to access that includes device information regarding the client device and location information of the client device;
 updating the representation data associated with the data item to include the information regarding the request to access; and
 providing the requested access and the updated representation data to the client device, wherein the client device displays a representation of the data item based on the updated representation data.

15. The method of claim 14, wherein the device information regarding the client device includes at least one of a name of the client device, a type of the client device, a screen size of the client device, a display resolution of the client device, or information regarding a network to which the client device is communicatively connected.

16. The method of claim 14, wherein the location information of the client device includes at least one of information regarding a registered location that is specific to a user of the client device, information regarding a GPS (Global Positioning System) coordinate of the client device, information regarding a cellular network to which the client device is communicatively connected, information regarding a Wi-Fi access point to which the client device is communicatively connected, or information regarding communication between the client device and at least one beacon.

17. The method of claim 14, further comprising:
 receiving, from the client device, a subsequent request to access the data item;
 receiving, from the client device, information regarding the subsequent request to access; and
 updating the representation data associated with the data item to include the information regarding the subsequent request to access.

18. The method of claim 14, further comprising:
 receiving, from another client device, a subsequent request to access the data item;
 receiving, from the another client device, information regarding the subsequent request to access; and
 updating the representation data associated with the data item to include the information regarding the subsequent request to access.

19. A non-transitory computer-readable storage medium having stored thereon computer-executable instructions that, in response to execution, cause a processor to perform operations, comprising:
 displaying, by a client device, a representation of a data item stored in a data storage, the representation being based on representation data associated with the data item received from a server, the representation comprising an indication of whether the data item has been accessed by a user account, information regarding a previous access by the user account for the data item, wherein the information regarding the previous access includes device information regarding at least one client device associated with the user account that previously accessed the data item and location information regarding a location at which the at least one client device previously accessed the data item;
 transmitting, by the client device, to the server, a request to access the data item by the user account and information regarding the request to access that includes device information regarding the client device and location information regarding a location at which the client device is requesting access to the data item, wherein the representation data associated with the data item is updated by the server to further include the transmitted information regarding the request to access;
 receiving, by the client device, the requested access to the data item and the updated representation data from the server; and
 displaying, by the client device, an updated representation of the data item based on the received updated representation data.

20. The non-transitory computer-readable storage medium of claim 19, wherein the device information regarding the client device includes at least one of a name of the client device, a type of the client device, a screen size of the client device, a display resolution of the client device, or information regarding a network to which the client device is communicatively connected when the data item is accessed.

21. The non-transitory computer-readable storage medium of claim 19, wherein the location information regarding a location at which the client device includes at least one of information regarding a registered location that is specific to the user account, information regarding a GPS (Global Positioning System) coordinate of the client device, information regarding a cellular network to which the client device is communicatively connected, information regarding a Wi-Fi access point to which the client device is communicatively connected, or information regarding communication between the client device and at least one beacon when the data item is accessed.

* * * * *

UNITED STATES PATENT AND TRADEMARK OFFICE
CERTIFICATE OF CORRECTION

PATENT NO. : 9,602,610 B2  
APPLICATION NO. : 14/007635  
DATED : March 21, 2017  
INVENTOR(S) : Kim It is certified that error appears in the above-identified patent and that said Letters Patent is hereby corrected as shown below:

In Column 1, Line 7, delete "§371" and insert -- § 371 --, therefor.

In Column 2, Line 4, delete "arc," and insert -- are, --, therefor.

Signed and Sealed this  
Eighth Day of August, 2017

Joseph Matal  
*Performing the Functions and Duties of the*  
*Under Secretary of Commerce for Intellectual Property and*  
*Director of the United States Patent and Trademark Office*